United States Patent

Hwang et al.

[11] Patent Number: 5,947,878
[45] Date of Patent: Sep. 7, 1999

[54] TOOL EXCHANGE DEVICE FOR MACHINING CENTERS

[75] Inventors: Wen-Miin Hwang; Chii-Zen Yu, both of Tainan, Taiwan

[73] Assignee: National Science Council, Taipei, Taiwan

[21] Appl. No.: 09/038,957

[22] Filed: Mar. 12, 1998

[30] Foreign Application Priority Data

Aug. 4, 1997 [TW] Taiwan .................................. 86213212

[51] Int. Cl.⁶ .................................................. B23Q 3/157
[52] U.S. Cl. .................................................. 483/44; 483/39
[58] Field of Search .................................. 483/38, 39, 40, 483/41, 42, 43, 44, 47, 45

[56] References Cited

U.S. PATENT DOCUMENTS

| 4,833,772 | 5/1989 | Kobayashi et al. | 483/44 |
| 5,081,762 | 1/1992 | Kin | 483/44 |
| 5,749,819 | 5/1998 | Yan et al. | 483/39 |
| 5,876,316 | 3/1999 | Kato | 483/44 |

FOREIGN PATENT DOCUMENTS

| 152037 | 8/1984 | Japan | 483/44 |
| 120935 | 5/1987 | Japan | 483/39 |
| 5-228709 | 5/1997 | Japan . | |

*Primary Examiner*—William Briggs
*Attorney, Agent, or Firm*—Birch, Stewart, Kolasch & Birch, LLP

[57] ABSTRACT

A tool exchange device is capable of automatically and swiftly exchanging tools during non-cutting processes. The tool exchange device includes a motor; a belt assembly capable of being driven by the motor; a reduction gear assembly having a worm engaged with the belt assembly, and a worm gear meshed with the worm; a compound cam having a concave globoidal cam, a first grooved face cam, a first cam follower, a second grooved face cam, and a second cam follower; a swap assembly having a swap arm, a rotation shaft affixed to the swap arm, and a set of rollers affixed to the rotation shaft and meshed with the grooves formed on the concave globoidal cam so as to drive the swap arm to rotate around its own axis through the compound cam; a force multiplying mechanism having a pivoted lever and a toggle assembly, and a slider, the pivoted lever being activated by the second cam follower of the compound cam so as to drive the slider to move reciprocally; and a head shaft having a head shaft housing, a push-pull rod, and a set of pan spring. The pan spring constantly urges the rod upward so as to clamp the tool during the cutting operation.

7 Claims, 5 Drawing Sheets

TOOL EXCHANGE DEVICE FOR MACHINING CENTERS

BACKGROUND OF THE INVENTION

1. Field of the Invention

This invention relates to a tool exchange device for machining centers, in particular to a tool exchange device with simple structure and capable of automatically and swiftly exchanging tools during cutting processes.

2. Description of Related Art

FIG. 1 is a perspective view showing a tool exchange device disclosed in Japanese Patent Gazette TOKU KOU HEI 5-228709. As shown in FIG. 1, a first reduction gear assembly 10 and a second reduction gear assembly 20 are arranged to transmit the power from a motor 4.

The first reduction gear assembly 10 includes two bevel gears 11 and 12. A grooved face cam 51 and a concave globoidal cam 52 are respectively formed on the sidewalls of the bevel gear 12. The grooved face cam 51 is used to drive a shaft 31 to move upward and downward by way of a cam follower 511, and the helical cam 52 is used to drive the shaft 31 to rotate around its own axis by way of a plurality of rollers 311 affixed on the peripheral wall of the shaft 31. By this arrangement, a swap arm 30 affixed to the lower end of the shaft 31 can be driven to move upward and downward and simultaneously to rotate around the axis of the shaft 31 so to facilitate the exchange of tools.

The second reduction gear assembly 20 includes two spur gears 21 and 22. A plate cam 53 integrally formed with the spur gear 22 is used to drive a cam follower 531 which is connected to a toggle assembly 46. By this arrangement, the second reduction gear assembly 20 can drive a push-pull rod 41 to move upward and downward so as to facilitate the uncoupling of a tool 44 from the lower end of the push-pull rod 41 and the coupling of another tool 45 with the lower end of the push-pull rod 41.

In the above tool exchange device, two reduction gear assemblies 10, 20 are used, therefore large installation space is required and manufacturing cost is high. Furthermore, due to that the tool exchange device is connected with the head shaft of machining tools, the movement of head shaft has to carry the tool exchange device during cutting operation. Therefore, additional power is required and efficiency becomes low.

SUMMARY OF THE INVENTION

In light of the above drawbacks, the object of this invention is to provide a tool exchange device. A first aspect of the tool exchange device comprises a motor having a drive shaft; a belt assembly having a first pulley engaged with the drive so as to rotate integrally with the drive shaft of the motor, a second pulley, and a belt used for coupling the first pulley with the second pulley so as to drive the second pulley by the motor through the first pulley; a reduction gear assembly having a worm engaged with the second pulley so as to rotate integrally with the second pulley, and a worm gear meshed with the worm; a compound cam, whose axis is integrally formed with the worm gear, having a concave globoidal cam with grooves formed on its outer peripheral rim, a first grooved face cam formed in one sidewall of the concave globoidal cam, a first cam follower engaged with the first grooved face cam, a second grooved face cam formed in the other sidewall of the concave globoidal cam, and a second cam follower engaged with the second grooved face cam; a swap assembly having a swap arm with two ends for clamping and releasing tools to be exchanged, a rotation shaft affixed to the central portion of the swap arm and coupled to the first cam follower so as to be driven to move along its own axis through the compound cam, and a set of rollers affixed on the outer peripheral surface of the rotation shaft and meshed with the grooves formed on the outer peripheral rim of the concave globoidal cam so as to drive the swap arm to rotate around its own axis through the compound cam; a force multiplying mechanism having a pivoted lever and a toggle assembly including a roller disposed at the joint of two toggle links, one toggle link being pivotally fixed at one end and the free end of the other toggle link being guided to move along a straight line, and a slider affixed at the free end of the toggle assembly, the pivoted lever being activated by the second cam follower of the compound cam to rotate pivotally to urge or move away from the roller of the toggle assembly so as to drive the slider to move reciprocally along the straight line; and a head shaft having a head shaft housing, a push-pull rod, and a set of pan spring disposed around the rod, the pan spring being used for constantly urging the rod upward so as to clamp the tool.

Furthermore, in the first aspect of the tool exchange device, the first grooved face cam and the second grooved face cam are groove shaped cams and the first cam follower and the second cam follower are respectively engaged within the first grooved face cam and the second grooved face cam via rollers.

Furthermore, in the first aspect of the tool exchange device, the grooves of the first grooved face cam, the second grooved face cam, and the concave globoidal cam are designed to have a shape enabling the tool exchange device to operate in a substantially smooth manner.

Furthermore, in the first aspect of the tool exchange device, the pivoted lever of the force multiplying mechanism is restrained by a spring so as to be constantly urged toward the second cam follower of the compound cam.

Furthermore, in the first aspect of the tool exchange device, a coil spring is disposed between the slider of the force multiplying mechanism and the upper end of the head shaft to constantly urge them to keep apart while the rod is clamped in the head shaft.

Furthermore, in the first aspect of the tool exchange device, the pivoted lever of the force multiplying mechanism is capable of being separated from the roller of the toggle assembly.

Furthermore, in the first aspect of the tool exchange device, the pivoted lever of the force multiplying mechanism is shaped substantially like an "L".

BRIEF DESCRIPTION OF THE DRAWINGS

This invention can be more fully understood by reading the subsequent detailed description and embodiments with reference made to the drawings, wherein.

DETAILED DESCRIPTION OF THE PREFERRED EMBODIMENT

Figure 1:
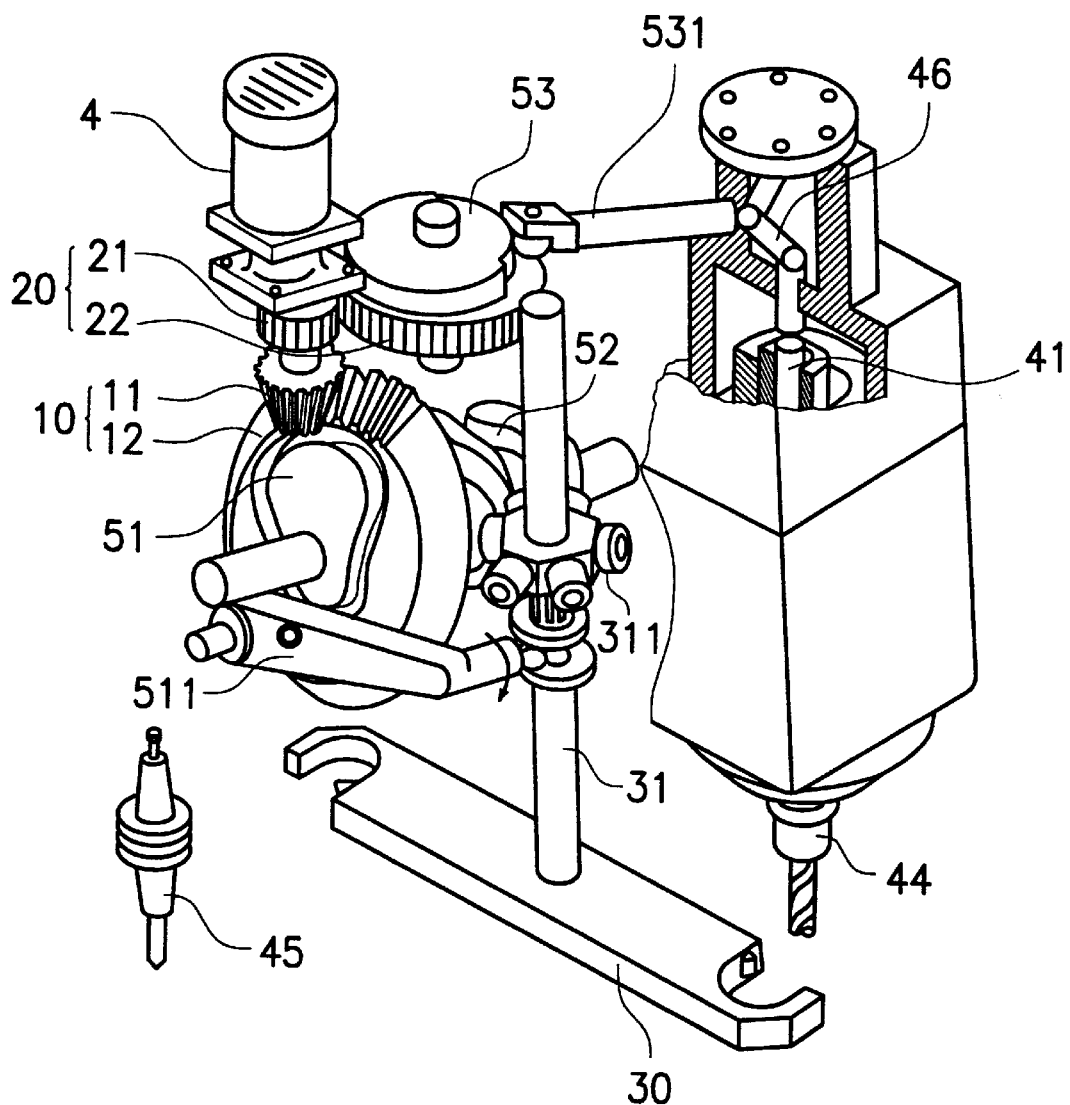
FIG. 1 is a perspective view showing the structure of a conventional tool exchange device.
Figure 2:
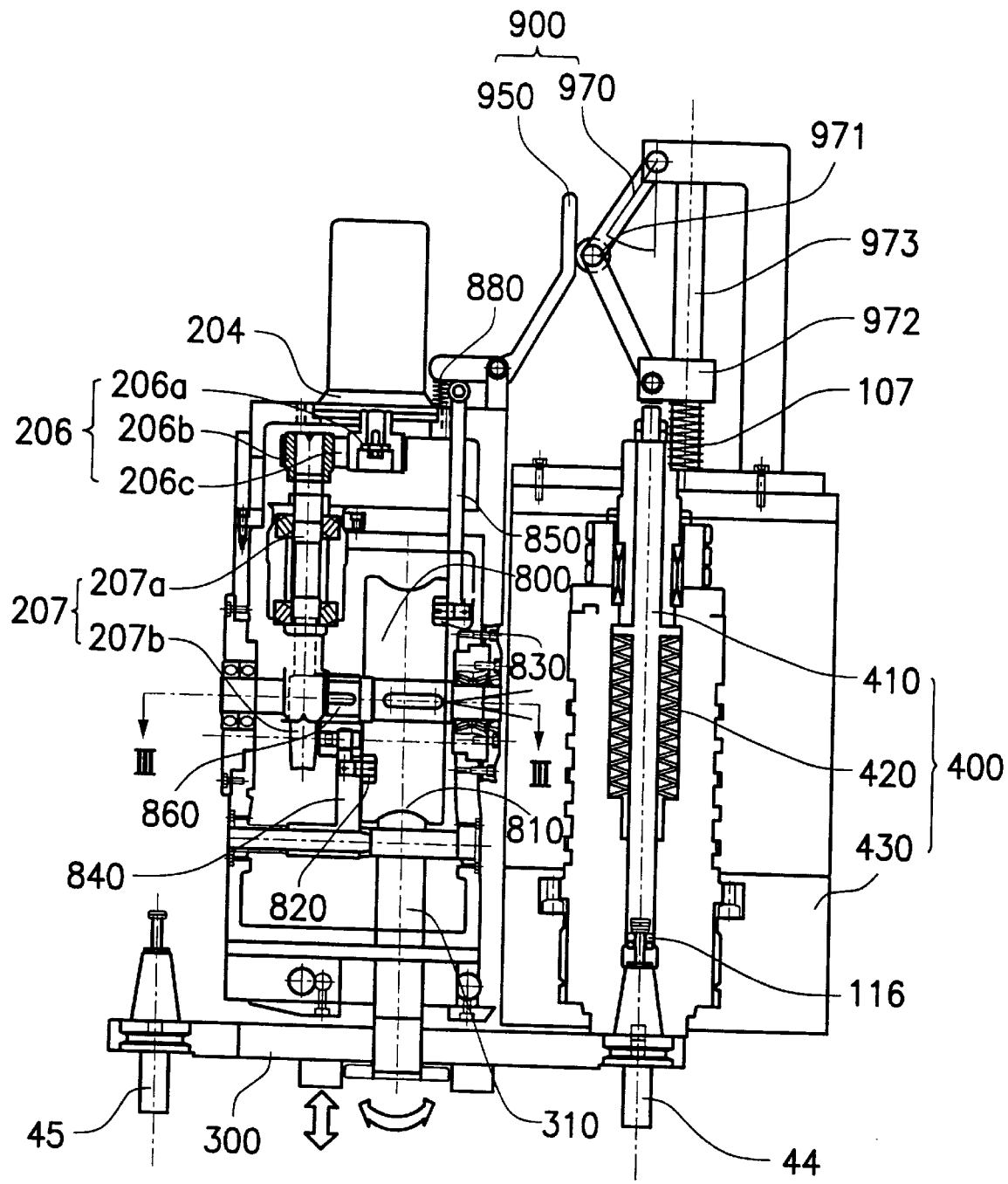
FIG. 2 is a cross-sectional view showing the structure of a tool exchange device according to this invention.

FIG. 2 is a cross-sectional view showing the structure of a tool exchange device according to this invention. As shown in FIG. 2, the tool exchange device according to this invention includes a motor 204, a belt assembly 206, a reduction gear assembly 207, a compound cam 800, a force multiplying mechanism 900, a swap arm 300, and a head shaft 400.

The belt assembly 206 consists of two pulleys 206a, 206b, and a belt 206c. The reduction gear assembly 207 includes a worm 207a and a worm gear 207b.

Figure 3:
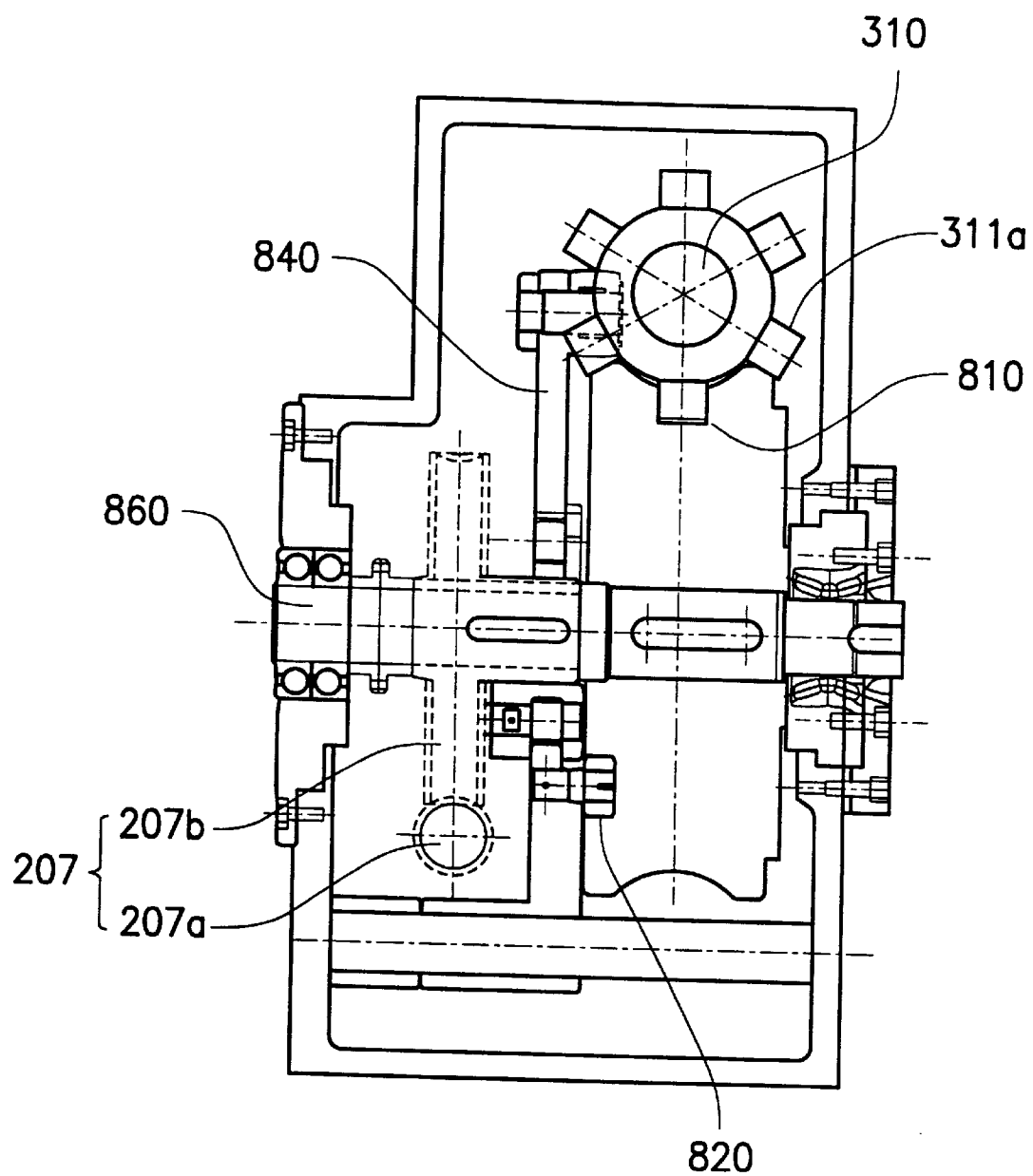
FIG. 3 is a cross-sectional view along line III—III, showing a compound cam in accordance with this invention.
Figure 4:
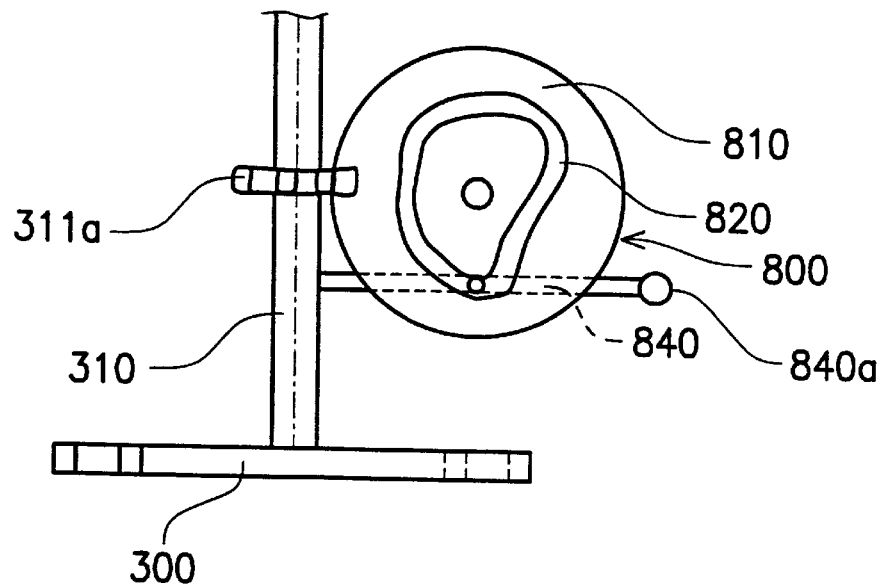
FIG. 4 is a left side view of the compound cam shown in FIG. 3.
Figure 5:
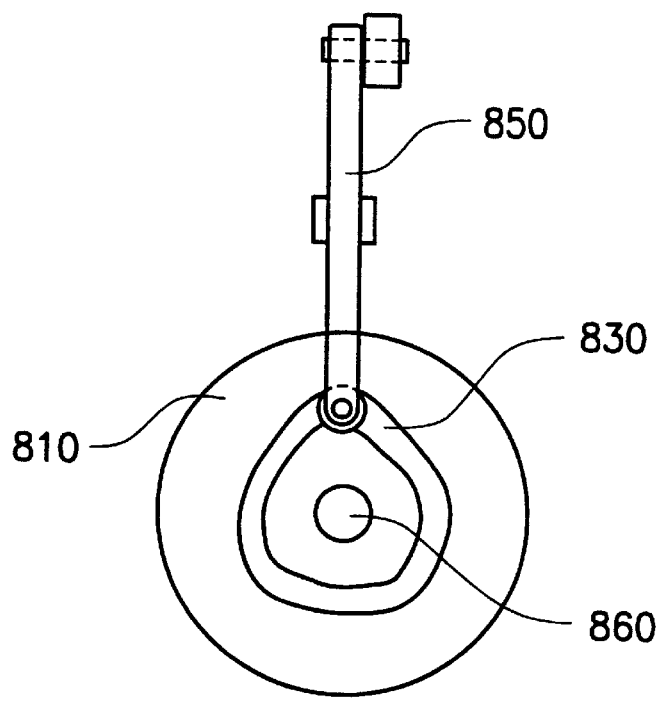
FIG. 5 is a right side view of the compound cam shown in FIG. 3.

As shown in FIGS. 3 to 5, the compound cam 800 includes a concave globoidal cam 810 having grooves formed on its outer peripheral rim, a first grooved face cam 820 formed in one sidewall of the compound cam 800, and a second grooved face cam 830 formed in the other sidewall of the compound cam 800. Furthermore, two cam followers 840, 850 are respectively engaging with the first grooved face cam 820 and the second grooved face cam 830 via rollers. Both of the first grooved face cam 820 and the second grooved face cam 830 are closed types. Namely, rollers of their cam followers 840, 850 move along closed paths.

The force multiplying mechanism 900 includes a lever 950 shaped substantially like an "L" and a toggle assembly 970. The toggle assembly 970 includes a roller 971 disposed at the joint of the toggle assembly, a slider 972 and a guide rail 973 for guiding the upward and downward movements of the slider 972. The lever 950 and the roller 971 are kept to contact with each other by the aid of a spring 107 restrained under the slider 972. The lower end of the lever 950 is kept to contact with the second cam follower 850 by the aid of a stretched spring 880 installed under the lower end of the lever 950.

The central portion of the swap arm 300 is connected with a rotation shaft 310, and a set of rollers 311a are affixed on the outer peripheral surface of the rotation shaft 310 (see FIG. 3). The head shaft 400 includes a push-pull rod 410, a set of pan spring 420, and a head shaft housing 430.

The following is a description of the operation of the tool exchange device in accordance with this invention.

Figure 6:
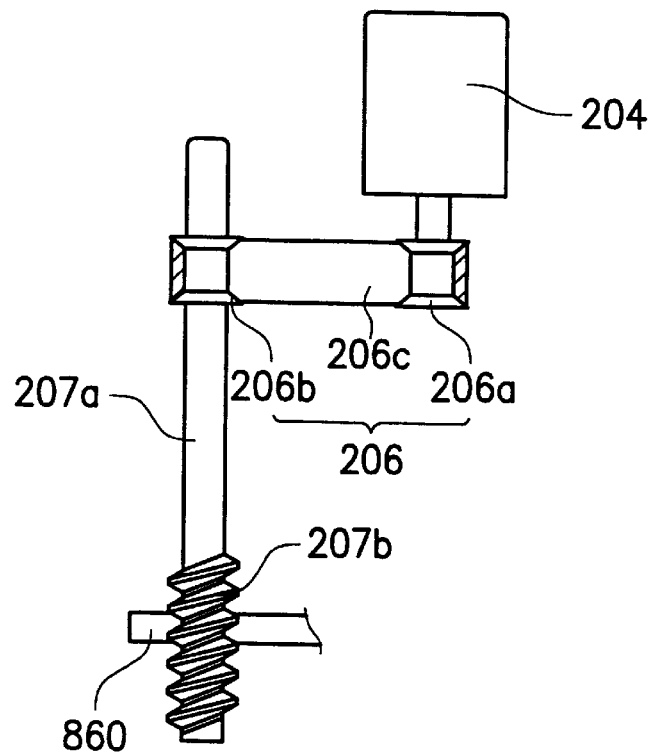
FIG. 6 is a front view showing the structure of the reduction gear assembly in accordance with this invention.

As shown in FIG. 6, the axis of the motor 204 is coaxial and connected with the axis of the pulley 206a. The axis of the pulley 206b is coaxial and connected with the axis of the worm 207a. The power of the motor 204 is transmitted to the worm 207a through the pulley 206a, the belt 206c, and the pulley 206b.

Figure 7:
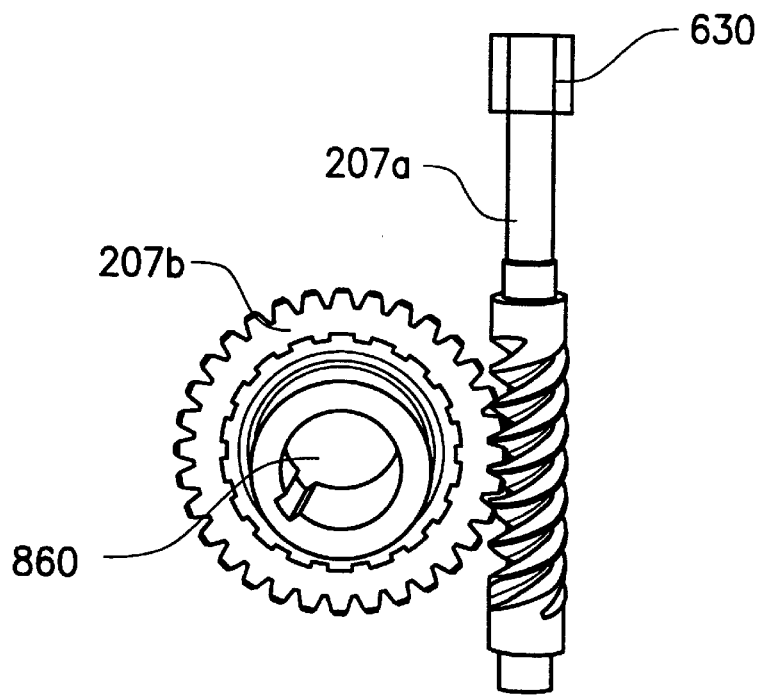
FIG. 7 is a side view of the reduction gear assembly shown in FIG. 6.

As shown in FIGS. 6 and 7, the worm gear 207b is coaxial and connected with the axis 860 of the compound cam 800. Thus, the power of the motor 204 can be transmitted to the compound cam 800 through the worm 207a and the worm gear 207b engaged with the worm 207a. As shown in FIGS. 3 and 4, when the compound cam 800 is driven to rotate, the grooved rim of the concave globoidal cam 810 will drive the rollers 311a, which are engaged with the grooved rim and affixed on the outer peripheral surface of the rotation shaft 310, to rotate around the rotation shaft 310. Meanwhile, the rotation shaft 310 will drive the swap arm 300 to proceed with the exchange of machining tools.

As shown in FIGS. 2 and 4, one end of the cam follower 840 is pivotally disposed around a fixed axis 840a, the other end of the cam follower 840 is sleeved around the rotation shaft 310 so that the rotation shaft 310 can rotate around its own axis and unable to move upward or downward relative to the cam follower 840. By this arrangement, the first grooved face cam 820 can drive the rotation shaft 310 to move upward or downward via the cam follower 840. Furthermore, the rotation shaft 310 can be driven to rotate around its own axis thorough the rollers 311a, which are engaged with the grooved rim and affixed on its outer peripheral surface. The movement of the swap arm 300 during the exchange of machining tools is performed by the combination of the above rotation movement and the up-down movement of the rotation shaft 310.

As shown in FIGS. 2 and 5, the second grooved face cam 830 can drive the cam follower 850 to move upward so as to guide the lever 950 to rotate around its pivot support and to urge the roller 971 of the toggle assembly 900. When the roller 971 is urged to move rightward, the slider 972 is pushed downward. When the slider 972 pushes down the rod 410, the pan spring 420 will be compressed, and steel balls 116 disposed within the lower end of the rod 410 will be guided to move outward in the radial direction following the downward movement of the rod 410. By this, the tool 44 is released from the lower end of the rod 410 and subsequently clamped by the swap arm 300.

When the cam follower 850 is driven to move downward and the tool 45 is inserted into the head shaft housing 430 by the swap arm 300, the pan spring 420 is released to urge the rod 410 to move upward such as to clamp the tool 45.

According to this invention, the swap arm 300 is driven to rotate by the rollers 311a affixed to the rotation shaft 310. The rollers 311a are driven to move by the concave globoidal cam 810. Furthermore, the entire exchanging operation of the tools is performed by the updown movement of the rotation shaft 310, and the rotation shaft 310 is driven to move upward and downward by the cam follower 840 whose movement is guided by the first grooved face cam 820. Meanwhile, the movement of the rod 410 is guided by the force multiplying mechanism 900 which is driven by the cam follower 850, and the movement of the cam follower 850 is guided by the second grooved face cam 830. The tracks of the first and the second grooved face cams 820, 830 are designed to activate the above-mentioned parts in a smooth manner.

Furthermore, during the downward or upward movement of the rod 410, the lever 950 is kept in contact with the roller 971 of the toggle assembly 970. However, during the cutting operation, the lever 950 is kept apart from the toggle assembly 970. Namely, the lever 950 is pulled back by the spring 880 during cutting operation, and the head shaft 400 needn't drive the total tool exchange device. Therefore, the power required to drive the head shaft 400 can be reduced.

In addition, the structure of the tool exchange device according to this invention is simple, and the manufacturing cost is low.

What is claimed is:

1. A tool exchange device for exchanging tools during non-cutting processes, comprising:

a motor having a drive shaft;

a belt assembly having a first pulley engaged with the drive so as to rotate integrally with the drive shaft of the motor, a second pulley, and a belt used for coupling the first pulley with the second pulley so as to drive the second pulley by the motor through the first pulley;

a reduction gear assembly having a worm engaged with the second pulley so as to rotate integrally with the second pulley, and a worm gear meshed with the worm;

a compound cam, whose axis is integrally formed with the worm gear, having a concave globoidal cam with grooves formed on its outer peripheral rim, a first grooved face cam formed in one sidewall of the cam plate, a first cam follower engaged with the first grooved face cam via a roller, a second grooved face cam formed in the other sidewall of the cam plate, and a second cam follower engaged with the second grooved face cam via a roller;

a swap assembly having a swap arm with two ends for clamping and releasing tools to be exchanged, a rotation shaft affixed to the central portion of the swap arm and coupled to the first cam follower so as to be driven to move along its own axis through the compound cam, and a set of rollers affixed on the outer peripheral surface of the rotation shaft and meshed with the grooves formed on the outer peripheral rim of the concave globoidal cam so as to drive the swap arm to rotate around its own axis through the compound cam;

a force multiplying mechanism having a pivoted lever and a toggle assembly including a roller disposed at the joint of two toggle links, one toggle link being pivotally fixed at one end and the free end of the other toggle link being guided to move along a straight line, and a slider affixed at the free end of the toggle assembly, the pivoted lever being activated by the second cam follower of the compound cam to rotate pivotally to urge the roller of the toggle assembly so as to drive the slider to move reciprocally along the straight line; and a head shaft having a head shaft housing, a push-pull rod above the tool, and a set of pan spring disposed around the rod, the pan spring being used for constantly urging the rod upward so as to clamp the tool.

2. A tool exchange device as claimed in claim 1, wherein the first grooved face cam and the second grooved face cam are groove shaped cams and the first cam follower and the second cam follower are respectively engaged within the first grooved face cam and the second grooved face cam via a roller.

3. A tool exchange device as claimed in claim 2, wherein the grooves of the first grooved face cam, the second grooved face cam, and the concave globoidal cam are designed to have a shape enabling the tool exchange device to operate in a substantially smooth manner.

4. A tool exchange device as claimed in claim 1, wherein the pivoted lever of the force multiplying mechanism is restrained by a spring so as to be constantly urged toward the second cam follower of the compound cam.

5. A tool exchange device as claimed in claim 1, wherein a spring is disposed between the slider of the force multiplying mechanism and the upper end of the head shaft to constantly urge them to keep apart while the tool is clamped in the head shaft.

6. A tool exchange device as claimed in claim 1, wherein the pivoted lever of the force multiplying mechanism is capable of being separated from the roller of the toggle assembly during the cutting operation.

7. A tool exchange device as claimed in claim 1, wherein the pivoted lever of the force multiplying mechanism is shaped substantially like an "L".

* * * * *